United States Patent
Kurpiela et al.

(10) Patent No.: US 6,215,104 B1
(45) Date of Patent: Apr. 10, 2001

(54) SOLDERING IRON

(75) Inventors: Gerhard Kurpiela, Brackenheim; Jürgen Staiger, Pfaffenhofen; Ralf Zerweck, Boennigheim, all of (DE)

(73) Assignee: Cooper Tools GmbH, Besigheim (DE)

( * ) Notice: Subject to any disclaimer, the term of this patent is extended or adjusted under 35 U.S.C. 154(b) by 0 days.

(21) Appl. No.: 09/101,506

(22) PCT Filed: Jan. 17, 1997

(86) PCT No.: PCT/EP97/00220

§ 371 Date: Sep. 17, 1998

§ 102(e) Date: Sep. 17, 1998

(87) PCT Pub. No.: WO97/26108

PCT Pub. Date: Jul. 24, 1997

(30) Foreign Application Priority Data

Jan. 17, 1996 (DE) .......................................... 296 00 771 U

(51) Int. Cl.[7] .................................................... B23K 1/00
(52) U.S. Cl. ............................. 219/238; 219/230; 228/51
(58) Field of Search .................................. 219/238, 230, 219/229; 228/51, 55

(56) References Cited

U.S. PATENT DOCUMENTS

| 925,056 | * | 6/1909 | Van Aller | 219/230 |
|---|---|---|---|---|
| 2,665,365 | * | 1/1954 | Thomas | 219/230 |
| 2,737,570 | | 3/1956 | Aita . | |
| 3,662,152 | | 5/1972 | Weller et al. . | |
| 3,919,524 | * | 11/1975 | Fortune | 219/238 |
| 5,059,769 | | 10/1991 | Fortune . | |
| 5,248,076 | | 9/1993 | Eisele et al. . | |

FOREIGN PATENT DOCUMENTS

| 682 406 | | 10/1939 | (DE) . | |
|---|---|---|---|---|
| 89 10 049 | | 11/1989 | (DE) . | |
| 267680 | * | 11/1989 | (DE) | 219/238 |
| 499 734 | | 8/1992 | (EP) . | |
| 437830 | * | 11/1935 | (GB) . | |
| 646139 | * | 11/1950 | (GB) | 219/229 |

* cited by examiner

Primary Examiner—John A. Jeffery
(74) Attorney, Agent, or Firm—Coats & Bennett, PLLC

(57) ABSTRACT

A soldering iron includes a housing for accommodating therein at least one heating element and a soldering bit which is releasably secured to the housing. The heating element includes a heat-transmitting contact surface provided on an end face thereof which faces the soldering bit. A heat reception surface of said soldering bit is located opposite the contact surface and in direct contact therewith with no intermediate layer therebetween. A temperature sensor is located adjacent the contact surface and between the contact surface and a filament winding of the heating element.

47 Claims, 8 Drawing Sheets

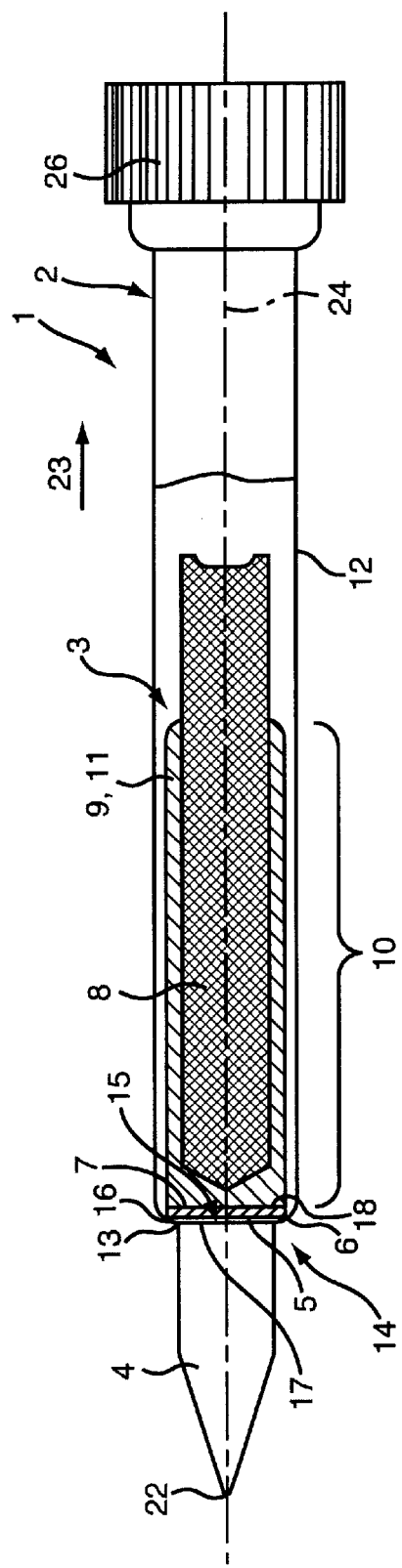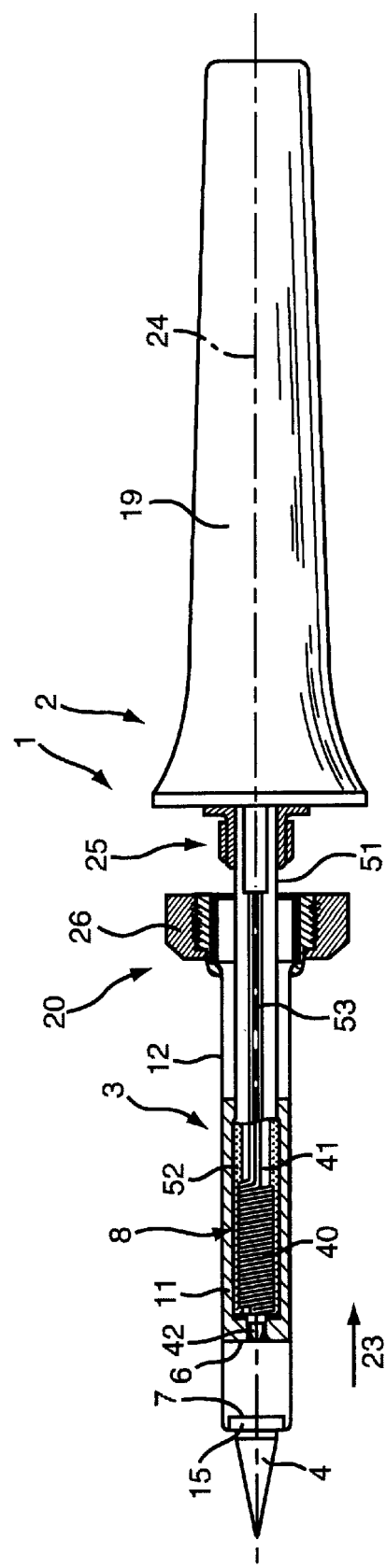

SOLDERING IRON

BACKGROUND OF THE INVENTION

The present invention refers to a soldering iron comprising a housing for accommodating therein at least one heating means, and a soldering bit which is releasably secured to said housing, said heating means including a heat-transmitting contact surface provided on an end face thereof which faces the soldering bit, and a heat reception surface of said soldering bit being located opposite said contact surface.

From practical experience, a soldering iron is, for example, known in the case of which the heating means and the soldering bit are arranged in spaced relationship with one another. The air cushion which is, consequently, formed between the heating means and the soldering bit impairs the transfer of heat between said heating means and said soldering bit.

In the case of a further soldering iron which is known from practical experience, the heating means and the soldering bit are fixedly connected to one another. Although this improves the transfer of heat from the heating means to the soldering bit, it makes it impossible to exchange the soldering bit separately for another one, if it is worn or damaged.

The soldering bit of said soldering iron is provided with a heat reception surface having depressions arranged therein or projections arranged thereon. Complementary projections or depressions are arranged in/on the contact surface on the end face of the heating means.

SUMMARY OF THE INVENTION

With respect to this prior art, it is therefore the object of the present invention to improve a soldering iron of the type mentioned at the beginning in such a way that production of said soldering iron is simple and that, simultaneously, the transfer of heat between the contact surface and the heat reception surface is optimized.

Due to the fact that the contact surface and the heat reception surface are plane-parallel throughout the whole area thereof and include neither any depressions nor any projections, they are very easy to produce. Furthermore, a heat-conducting, essentially direct contact with no intermediate layer there between exists between said contact surface and said heat reception surface, said direct contact optimizing the transfer of heat between said surfaces and providing, in combination with the plane-parallel structural design of said surfaces, a backlash-free contact, which prevents heat-insulating intermediate layers, such as an air cushion, between the contact surface and the heat reception surface to a very large extent.

The production of the soldering bit and of the bit holder is additionally simplified by the fact that these components and, consequently, the contact surface and the heat reception surface are axially symmetrical with respect to the longitudinal axis of the soldering bit and of the bit holder, respectively.

In order to permit the soldering bit and the bit holder to be aligned in a simple manner relative to one another, when the soldering bit is secured to the soldering iron by means of the bit holder, the contact surface and the heat reception surface can be adapted to be rotated relative to one another. The rotary displaceability in combination with the plane-parallel structural design of the contact surface and of the heat reception surface and the direct contact between said surfaces additionally permit a better elimination of an air cushion which may, for example, exist between said surfaces.

The contact surface and the heat reception surface may have different contours. They can be angular or oval. Circular surfaces are preferably used for the contact surface and the heat reception surface because they can be rotated relative to one another more easily and because they are less difficult to produce. In this connection, it will also be advantageous when the two circular surfaces have the same radius. In this case, the surfaces will be in full direct contact without one surface projecting outwardly beyond the other.

When the soldering bit is electroplated, especially the marginal areas of the heat reception surface, which projects normally outwards in the radial direction relative to the rest of the soldering bit, can be provided with a slightly thicker layer of the material, which is applied by electroplating, than the area remote from said marginal areas. In order to guarantee also in this case an essentially direct contact with no intermediate layer there between the contact surface and the heat reception surface, said heat reception surface can be larger than the contact surface. In this way, the contact surface will be in direct contact with the heat reception surface only in the area surrounded by the marginal area. An additional treatment of the heat reception surface after the electroplating process can be avoided in this way. If, however, such an additional treatment is carried out, e.g. by face grinding or the like, the heat reception surface can, of course, also have the same size as the contact surface.

In accordance with a simple embodiment, the heating means can be an electrically heatable heating element; the heating element end face which faces the soldering bit can directly be the contact surface.

In order to optimize the transfer of heat between the heating means and the soldering bit, at least the contact surface of the heating means or of the heating element can consist of a material for optimizing the transfer of heat, i.e. a material having a high thermal conductivity coefficient. Such materials are e.g. copper, silver or the like.

In order to accelerate and optimize the transfer of heat from the heating means to the contact surface, the end portion of the heating element, which faces the soldering bit, can be inserted in a sleeve consisting of a material having a high thermal conductivity coefficient. In this case, the contact surface is formed on an end face of the sleeve, which faces the soldering bit. The transfer of heat from the heating element to the contact surface is accelerated and optimized by said sleeve.

The housing of the soldering iron can comprise several parts, a handle section accommodating, for example, suitable control electronics for controlling the temperature of the soldering bit. The handle section is provided with an insulation, and this permits the soldering iron to be held. Said insulation prevents a transfer of heat from the heating means to the outer surface of the handle section.

In this connection, it will be advantageous when the housing comprises a bit holder which is releasably secured to the rest of the housing so as to simplify the structural design of the soldering iron. When said bit holder is at its fastening position, it presses the contact surface and the heat reception surface firmly onto one another so that the direct contact with no intermediate layer there between is established. It will be advantageous when the bit holder has a sleeve-shaped structural design and defines a bit-holding sleeve in which at least an end portion of the heating element or heating means is arranged, the soldering bit being releasably secured to the free end of said bit-holding sleeve.

For establishing—when the bit holder is secured to the rest of the housing—a direct contact between the heat reception surface of the soldering bit and the complementary contact surface and for fastening the soldering bit to the soldering iron simultaneously in a simple manner, the free end of the bit-holding sleeve is provided with an opening through which the soldering bit projects, the end of the soldering bit facing the heating means being provided with an at least partially circumferentially extending collar engaging behind an opening edge of the opening. This permits the soldering bit to be passed easily through the opening from the interior of the bit holder until its collar comes into contact with the opening edge. By screwing the bit holder onto the rest of the housing of the soldering iron, or by fastening it in some other way to said housing, the heat reception surface of the soldering bit is, subsequently, pressed onto the contact surface of the heating means so that said surfaces are in direct contact with each other.

With regard to the direct contact between the heat reception surface and the contact surface, reference is additionally made to the fact that the normal lines associated with these two surfaces can extend parallel to or at an angle to the longitudinal axis of the soldering bit or of the soldering iron. A rotation of the two surfaces relative to one another is given when said normal lines extend parallel to the longitudinal axes.

The direct contact between the two surfaces and, simultaneously, a wobble-free mounting of the soldering bit in the bit holder are supported by the backlash-free contact between the opening edge and the collar; said opening edge and said collar can be provided with contact bevels which face each other and which are in contact with each other.

In this connection, it will suffice when the opening edge extends radially inwards in the direction of the longitudinal axis and when e.g. only the collar is provided with a suitable contact bevel. The combined effect of the opening edge and of the contact bevel will provide both centering of the soldering bit and wobble-free mounting. Oblique contact bevels can also be dispensed with in this connection, and the opening edge and a complementary contact bevel of the collar can extend essentially at right angles to the longitudinal axis of the soldering bit or of the bit holder.

A retaining projection can project essentially radially outwards beyond the soldering bit at least at certain locations and in spaced relationship with the collar so as to prevent the soldering bit from being detached from the bit holder when said bit holder is being released. When said bit holder is being released, this retaining projection can come into contact with the complementary opening edge and prevent the soldering bit from falling into the bit holder too early. In this way, the bit holder can be released from the rest of the soldering iron together with the soldering bit.

In accordance with a simple embodiment, the retaining projection can be an annular bead extending around the soldering bit. This annular bead has an outer diameter which corresponds at least to the inner diameter of the opening of the bit holder. Even if this outer diameter is slightly larger than the inner diameter of the opening, the soldering bit can, in the detached condition of the bit holder, be forced into the interior of said bit holder and separated therefrom in this way with little effort.

In this connection, it will also be advantageous when a groove is formed between the retaining projection and the collar, said groove being used for receiving therein at least part of the opening edge. The groove can also extend in the form of an annular groove along the whole circumference of the soldering bit.

The above-mentioned groove can, for example, also be used for holding the soldering bit during the electroplating process. In this connection, said groove can be formed in the soldering bit, in the case of soldering bits with or without retaining projections, in the direction of the front end of said soldering bit in spaced relationship with the collar or also directly adjacent the collar. In each case, the groove is provided so as to permit the opening edge of the bit holder to engage said groove at least at certain locations or along certain parts thereof. By means of this arrangement, the soldering bit can be held by the bit holder with the aid of the engagement between the opening edge and the groove even if the bit holder is detached from the rest of the soldering iron. It is, of course, also possible to implement the groove as a circumferential groove extending around the whole bit holder; in this case, the opening edge can engage the circumferential groove along the whole length thereof. The groove can be arranged in an advantageous manner at least on opposite sides of the soldering bit; in this case, the opening edge engages the groove at these locations.

In this connection, it may also prove to be advantageous when the soldering bit and/or the bit holder have an essentially oval or elliptical cross-section at least in the area of the groove and/or of the opening edge. The groove and the opening edge can lockingly engage in this way, when little pressure is applied thereto. When the soldering bit is being replaced, the soldering bit cannot fall out of the bit holder inadvertently, but the bit holder and the soldering bit locked in position thereon can be put down and replaced by a different bit holder having a suitable soldering bit attached thereto. In addition, worn or damaged soldering bits can be released from the engagement with the opening edge by light pressure and removed from the bit holder in this way.

The opening edge engaging the groove and the groove can have complementary structural designs so as to permit a positive engagement. Furthermore, it may prove to be advantageous when the opening edge engages the groove with a certain amount of play, the groove having then a larger cross-section in comparison with the opening edge engaging said groove. In addition, the groove can have an asymmetrical cross-section with respect to the radial direction. This asymmetrical cross-section can, for example, be of such a nature that the groove has a contact surface for the opening edge on the side facing the heat reception surface. Said contact surface alone or said contact surface in combination with a contact surface of the collar can serve to fasten the soldering bit by means of the bit holder. The groove can also be arranged in such a way—i.e. essentially without any distance from the collar—that the contact bevel or surface of the collar extends up to an into said groove. If no collar is provided, the soldering bit can also be held by the bit holder only by means of the engagement between the opening edge and the groove, and secured to the heating means.

In order to influence the elastic properties of the bit holder in the area of the opening, it may prove to be advantageous when the bit holder is provided with a notch, which is arranged in spaced relationship with the opening of said bit holder and which extends essentially at right angles to the longitudinal axis. This notch can have a U-shaped or a V-shaped cross-section. The notch can be provided on the inner side or on the outer side of the bit holder, whereby a raised portion or a depression will be formed on the outer surface of said bit holder. In addition, the notch can have an asymmetrical cross-section, i.e. the respective legs of the U or of the V are inclined at different angles relative to a radial direction of the bit holder.

In order to increase the elasticity of the opening edge, the notch is preferably implemented as a depressed notch which is displaced inwardly in the direction of the longitudinal axis.

For obtaining in this connection identical elastic properties symmetrically with respect to the longitudinal axis, the depressed notch can be implemented as a circumferential notch extending around the bit holder. When the bit holder is being fastened to the rest of the soldering iron, this will result in an improved elasticity for the bit holder end arranged above said notch and especially for the opening edge thereof so that the heat reception surface of the soldering bit can be pressed onto the contact surface in full-area contact therewith.

The effect produced by the notch is enhanced when the distance between the notch and the opening is at least equal to the distance between the contact surface and the opening. This applies to the condition in which the bit holder is secured to the soldering iron.

In order to be able to utilize the relative rotational displaceability of the heat reception surface and the contact surface when the bit holder is being fastened to the rest of the soldering iron, it will be particularly advantageous when the frictional engagement existing between the opening edge and the collar is stronger than that existing between the contact surface and the heat reception surface. This will have the effect that the soldering bit is moved together with the bit holder when said bit holder is being fastened to the soldering iron, and that the contact surface and the heat reception surface are rotated relative to one another until an intimate direct contact between said two surfaces has been established. In the course of this process, said surfaces can be smoothed to a certain extent due to the fact that they are rotated relative to one another, whereby possibly existing surface roughnesses will be ground off.

For controlling the temperature in a simple manner, it will be advantageous to associate a temperature sensor with the heating means and/or the soldering bit. If such a temperature sensor is associated with the heating means and with the soldering bit, the temperature gradient along the soldering iron axis can simultaneously be adjusted via suitable electronic means so that the soldering iron can be used in the best possible manner.

In order to fasten the bit holder and the soldering bit rapidly to the rest of the soldering iron, or in order to detach them rapidly from the rest of the soldering iron, a quick-change system can be provided between the bit holder and a handle section of the housing. By means of the quick-change system that is used especially for the soldering bit, said soldering bit, which is a wearing part, can be replaced easily, said wearing part being reduced to a minimum when the bit is as small as possible and when it is formed separately from the heating means.

The quick-change system can be realized in different ways.

Said quick-change system can, for example, comprise a threaded flange attached to said handle section, and a knurled nut rotatably supported on the bit holder. In accordance with a further embodiment of the quick-change system, there are arranged a flange, which is attached to the handle section and which is provided with an oblique groove, and at least one bolt provided in the bit holder and adapted to be guided along said groove. Such a bolt can project on the inner side of a ring which is rotatably supported on one end of the bit holder.

Furthermore, the quick-change system can comprise a threaded flange attached to the handle section and a snap-to thread provided on the bit holder. Such a snap-to thread can consist of two parts and it can be spring-loaded in the direction of its open position.

The threads used for screwing together the various parts of the quick-change system can be fine-pitch threads, coarse-pitch threads or multiple threads. The thread can also be a multiple coarse-pitch thread for rapid release; said multiple coarse-pitch thread can have a short angle of rotation and it can be of the self-locking type.

Further respective quick-change systems comprise a hook nut on the bit holder and an obliquely extending clamping nut in the handle section, or a locking element on the bit holder and a counterlocking element on the handle section. The locking element can consist of teeth and the counterlocking element can consist of a locking slide member.

Further embodiments of the quick-change system are apparent.

In the case of the various quick-change systems, it may also prove to be advantageous when the bit holder or the bit-holding sleeve is open on one side thereof at least adjacent its free end.

In order to be able to hold the soldering bit safely, especially when the objects to be soldered are small or when the operation to be carried out must be performed very accurately, it will be advantageous when the soldering iron can be held at a point which is located as close to the soldering bit as possible. This can be achieved by the feature that a tulip-shaped handle portion, which is conically enlarged in the direction of the soldering bit, projects from the handle section and surrounds the bit holder at least partially. The tulip-shaped handle portion essentially serves to extend the handle section in the direction of the soldering bit.

In this connection, an advantageous embodiment can be achieved on the basis of the features that the tulip-shaped handle portion is supported on said bit holder and that a quick-change system is provided between the end of said tulip-shaped handle portion which faces the handle section and said handle section. Analogously to the above-mentioned hook nut, knurled nut or the like, the tulip-shaped handle portion can rotatably be supported on the bit holder. In this connection, it must, however, be taken into account that the frictional engagement between the tulip-shaped handle portion and the bit holder and also between the other quick-change systems and the bit holder must at least be firm enough for entraining the bit holder, whereby the above-mentioned relative rotation between the contact surface and the heat reception surface will be caused, before said bit holder is finally secured to the handle section. The respective part of the quick-change system provided on the bit holder can also be connected to said bit holder such that it is secured against rotation relative thereto.

In order to realize an electrically heatable heating element in a simple manner, said heating element can comprise a filament winding, especially a filament winding that is wound onto a winding carrier. The winding carrier can be produced from a ceramic material. Furthermore, also the heating element as such can consist of ceramic and a temperature sensor can be embedded in ceramic material in said heating element. In order to prevent the contact surface and the heat reception surface from scaling or from adhering to one another when the soldering iron is in use, the heat reception surface and/or the contact surface are provided with a metallic blocking layer consisting especially of chromium or nickel. The bit can preferably consist of copper. The heating element, or at least the end face thereof, can consist of silver, the metallic blocking layer preventing these materials from caking.

BRIEF DESCRIPTION OF THE DRAWINGS

In the following, the present invention will be described and explained in detail on the basis of the figures enclosed as drawings, in which FIG. 1 shows a side view, partly in section, of a front end of a soldering iron;

FIG. 2 shows a soldering iron with a bit holder, partly in section, and a quick-change system;

DETAILED DESCRIPTION OF THE INVENTION

Figure 3:
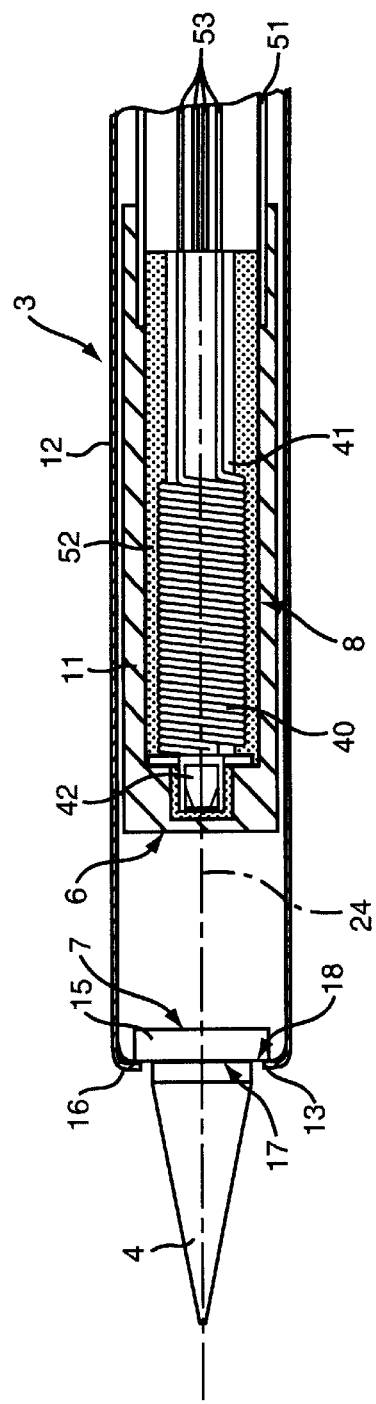
FIG. 3 shows an enlarged representation of a heating means according to FIG. 2.

FIG. 1 shows the front end of a soldering iron 1. This soldering iron comprises a housing 2, only part of which is shown. For example, a handle section 19 used for holding the soldering iron, cf. e.g. FIG. 2, is not shown.

The housing 2 comprises a bit holder or sleeve 12, the end of said bit holder or sleeve 12 located opposite a soldering bit 4 being adapted to be screwed onto the rest of the housing, e.g. the handle section, or to be secured to said rest of the housing in some other way.

The bit-holding sleeve 12 is essentially hollow-cylindrical, and a heating means 3 is arranged in the interior thereof. This heating means 3 consists of an electrically heatable heating element 8 and of a sleeve 11 which is attached to at least an end portion 10 of the heating element 8 and which consists of a material 9 having a high heat-transfer coefficient. The end portion 10 of the heating element 8 can completely fill the interior of said sleeve 11. The heating element 8 is at least at its end facing the soldering bit 4 in rear contact with a contact surface 6 of said sleeve 11, said contact surface 6 being formed on said sleeve 11 on the end face facing the soldering bit 4.

In FIG. 1, an air gap is shown between a heat reception surface 7 of the soldering bit 4 and the contact surface 6 of the sleeve 11. This serves to simplify the description of the surfaces in question, the contact surface 6 and the heat reception surface 7 being in heat-conducting, direct contact with no intermediate layer there between with each other when the bit-holding sleeve 12 is displaced relative to the heating means 3 in the fastening direction 23 so as to secure said bit-holding sleeve 12 fully to the rest of the housing.

The contact surface 6 and the heat reception surface 7 extend plane-parallel to one another and they are arranged at right angles to the longitudinal axis 24. In the embodiment shown, said surfaces are circular and they have identical radii.

The bit-holding sleeve 12 has an opening 13, which is provided at the free end 14 thereof and beyond which the soldering bit 4 projects. The opening 13 is surrounded by an opening edge 16 which is bent over in the direction of the longitudinal axis 24 of the soldering iron or soldering bit. A collar 15 surrounding the heat reception surface 7 at least partially engages behind said opening edge 16. The oppositely located front end 22 of the soldering bit 4 has a tapering shape.

Figure 7:
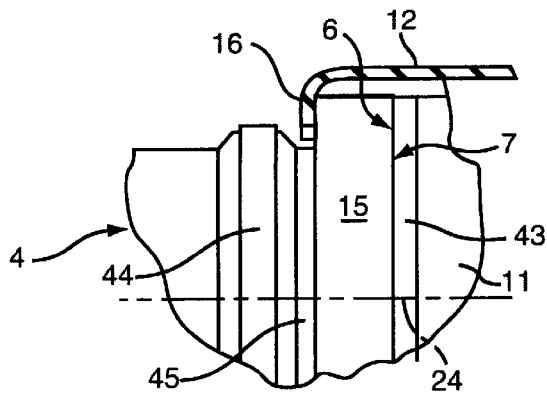
FIG. 7 shows an enlarged representation of a second embodiment used for fastening a soldering bit.
Figure 8:
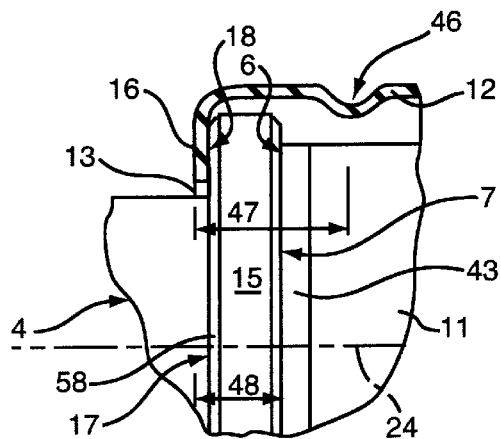
FIG. 8 shows an enlarged representation of a third embodiment used for fastening a soldering bit.
Figure 9:
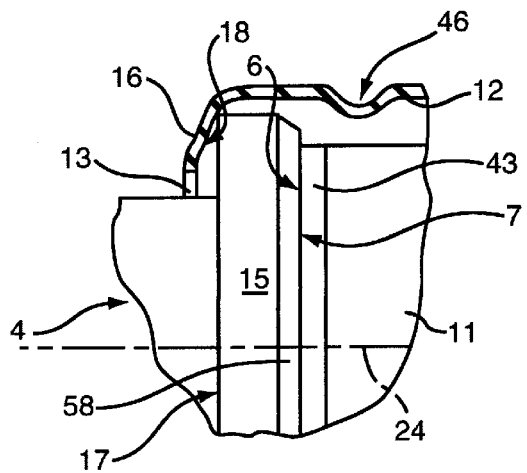
FIG. 9 shows an enlarged representation of a fourth embodiment used for fastening a soldering bit.

Between said collar 15 and the rest of the soldering bit 4, a contact bevel 17 is formed, which extends inwards at an oblique angle towards the longitudinal axis 24 and which is in contact with a complementary contact bevel 18 formed on the inner side of the opening edge 16, cf. e.g. also FIG. 7 to 9.

FIG. 2 shows side view, partly in section, of a soldering iron 1 with a housing 2. The housing 2 comprises a handle section 19 which is known per se; the handle section end facing the soldering bit 4 has secured thereto a threaded flange 25 forming a quick-change system 20 together with a knurled nut 26 on the bit holder 12. A further part of the housing 2 is formed by said bit holder 12 containing the heating means 3. The heating means 3 comprises a heating element connection tube 51 which extends through said threaded flange 25 and into said handle section 19. Electric supply lines 53 extend in the interior of said heating element connection tube 51, said electric supply lines 53 being used for the electrically heatable heating element 8 as well as for a temperature sensor 42 which is arranged adjacent the contact surface 6 in the heating element sleeve 11.

The heating element 8 is defined by a filament winding 40 wound onto a ceramic winding carrier 41. The filament winding, the winding carrier and the temperature sensor are surrounded by a ceramic material 52 within said sleeve 11.

In the embodiment shown, the heat reception surface 7 and the contact surface 6 are arranged in spaced relationship with one another, since the bit holder 12 has not yet been secured to the handle section 19 by means of the quick-change system 20.

FIG. 3 shows an enlarged representation of the heating means 3 according to FIG. 2. Identical elements are designated by identical references numerals, and only part of said identical elements is mentioned again.

The heating element connection tube 51 ends in the heating element sleeve 11 in spaced relationship with the filament winding 40. The heating element connection tube 51 is filled with ceramic material 52 at least in the end section thereof.

In contrast to the embodiment according to FIG. 1, the contact bevels according to FIG. 3 are formed at right angles to the longitudinal axis 24 and extend radially inwards towards said longitudinal axis.

Figure 4:
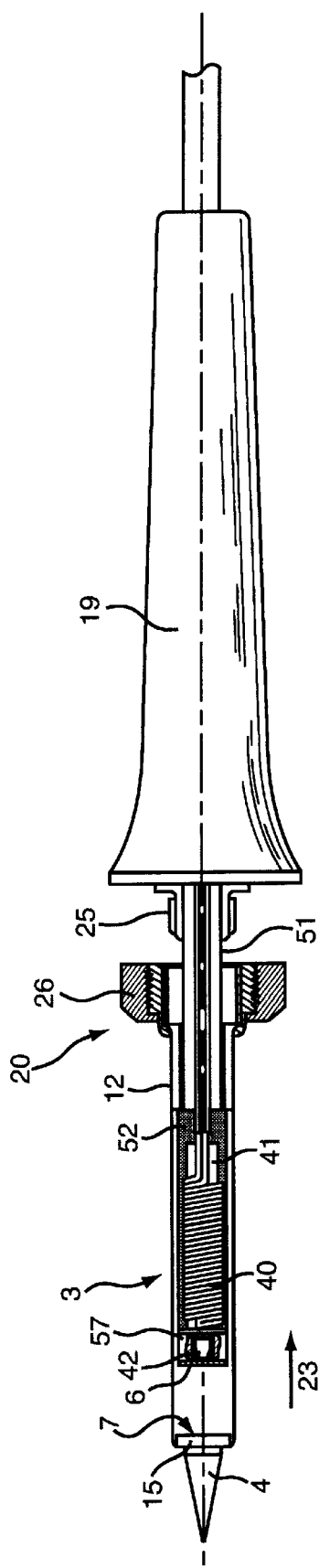
FIG. 4 shows a soldering iron with a bit holder, partly in section, and a quick-change system analogously to the soldering iron according to FIG. 2 with a different type of heating means.

FIG. 4 shows a further embodiment of a heating means 3. In this case, the winding carrier 41 for the filament winding 40 is surrounded by ceramic material 52 also in the direction of the handle section 19. As for the rest, reference is made to the description concerning FIGS. 2 and 3.

Figure 5:
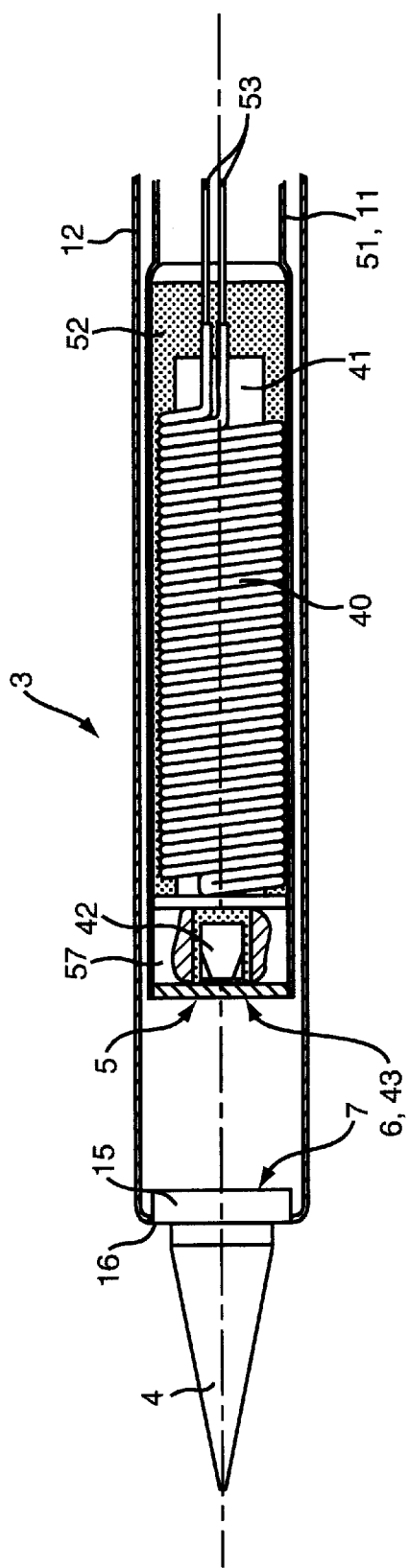
FIG. 5 shows an enlarged representation of the heating means according to FIG. 4.

FIG. 5 shows an enlarged representation of the heating means 3 according to FIG. 4. Identical elements are again designated by identical references numerals.

In this embodiment, the heating element connecting tube 51 extends up to the temperature sensor 42 and defines a heating element sleeve 11 which is open at the end facing the soldering bit 4. This end has arranged therein a heat transfer body 57 which surrounds the temperature sensor 42 and which is formed of ceramic material integrally with the winding carrier 41. The heat transfer body 57 is provided with the contact surface 6 at the end face 5 facing the soldering bit 4. This contact surface 6 can be formed directly by the end face of said body 57 or by a blocking layer 43 applied to the end face 5 of said body 57.

Figure 6:
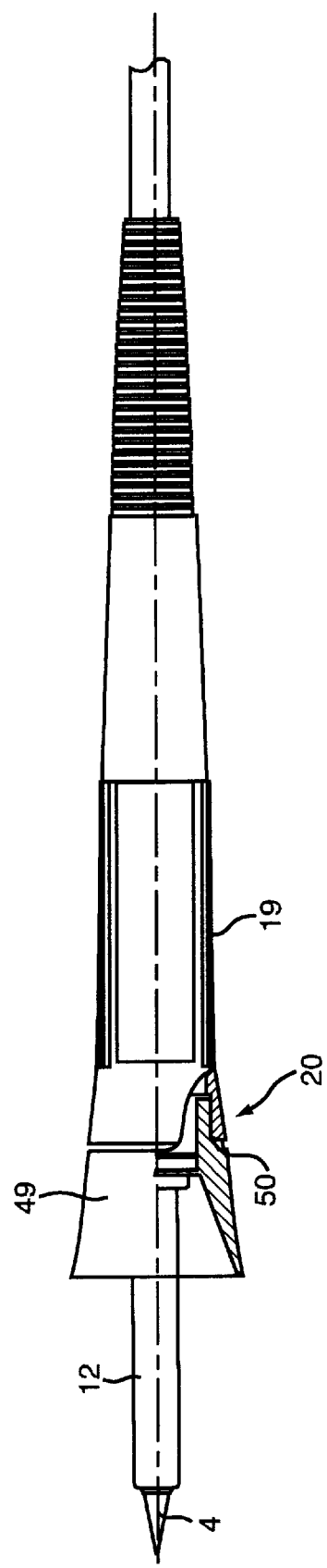
FIG. 6 shows a soldering iron with a tulip-shaped handle portion.

FIG. 6 shows a further embodiment of the soldering iron having a tulip-shaped handle portion 49 arranged on the end of the handle section 19 facing the soldering bit 4 or the bit holder 12. This tulip-shaped handle portion 49 extends from said handle section 19 in the direction of the soldering bit 4 and it has an outwardly enlarging conical shape. Said tulip-shaped handle portion can be formed integrally with the handle section, or, as shown in the embodiment according to said figure, it can be connected to said handle section 19 via a quick-change system 20 at its end 50 facing said handle section 19. With regard to the various embodiments for the quick-change system 20, reference is in this connection made to the preceding embodiments of the soldering iron and to the explanations concerning FIG. 10 et seq.

FIGS. 7, 8 and 9 show various examples of the manner in which a soldering bit 4 is mounted in the bit holder 12.

In FIG. 7, the soldering bit 4 is provided with a retaining projection 44 extending in spaced relationship with the collar 15. This retaining projection 44 is implemented as a circumferentially extending annular bead merging with the soldering bit via edges extending at an oblique angle inwards towards the longitudinal axis 24. Between said annular bead 44 and the collar 15, a groove 45 is provided at least part of which is engaged by the opening edge 16.

The contact bevels of the opening edge 16 and of the collar 15, which abut on one another, are essentially plane-parallel and they extend at right angles to the longitudinal axis 24.

The collar 15 is in direct contact with the contact surface 6 of a blocking layer 43 of the heating element sleeve 11 via its heat reception surface 7.

In FIG. 7, the outer diameter of the circumferential bead 44 is essentially equal to or slightly larger than the inner diameter of the opening edge 16.

In the embodiment according to FIG. 8, no retaining projection 44 is provided. Instead of a retaining projection, two end bevels 58 are formed on the collar 15, said end bevels 58 extending in the direction of the longitudinal axis 24 and terminating in the heat reception surface 7 and in the contact bevel 17, respectively. The contact bevel 17 and the complementary contact bevel 18 of the opening edge 16 extend plane-parallel and at right angles to the longitudinal axis 24. In contrast to the embodiment according to FIG. 7, the bit holder 12 according to FIG. 8 is provided with a notch 46 on the outer side thereof, said notch being formed by a substantially U-shaped depression in said bit holder 12 in the direction of the longitudinal axis 24. The depression extends around the whole bit holder 12 in the form of a depressed or circumferential notch.

The distance 47 between said notch 46 and the opening 13 or the opening edge 16 is larger than the distance 48 between the opening 13 and the contact surface 6.

In FIG. 9, the collar 15 has only one end bevel 58 between the outer surface of the collar, which faces the bit holder 12, and the heat reception surface 7. A complementary end bevel in the direction of the contact bevel 17 is not provided. According to FIG. 9, the opening edge 13 and the contact bevel 18 formed on the opening-edge bottom side, which faces the collar 15, extend at an oblique angle upwards towards the soldering bit 4. Due to this mode of arrangement, an angle is formed between the contact bevels or contact surfaces 17 and 18, the opening edge 16 being only in contact with an outer edge of the collar 15.

Also in FIG. 9, a depressed or circumferential notch 46 is formed in the bit holder 12. When seen in a cross-sectional view, the notch is substantially U-shaped; one leg of said U, which extends in the direction of the opening edge 16, extending at a larger angle to the longitudinal axis 24 than the other leg of the U so that the notch has an asymmetrical shape when seen at right angles to the longitudinal axis 24.

In FIGS. 10 to 18, which follow hereinbelow, various embodiments for the quick-change system 20 are shown.

Figure 10:
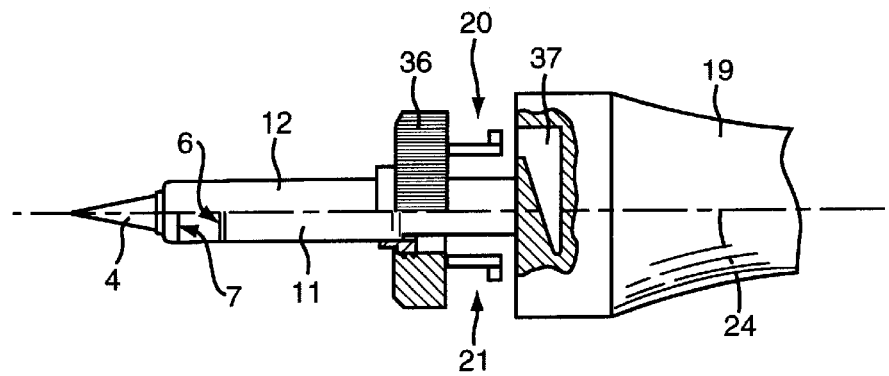
FIG. 10 shows, partly in section, a side view of a front end of a soldering iron with a second embodiment for a quick-change system.

According to FIG. 10, the quick-change system 20 is defined by a hook nut 36 provided with suitable fastening hooks 21 which are adapted to be brought into engagement with clamping nuts 37 on the inner side of the handle section 19. The hook nut 36 is rotatably supported on the bit holder 12.

Figure 11:
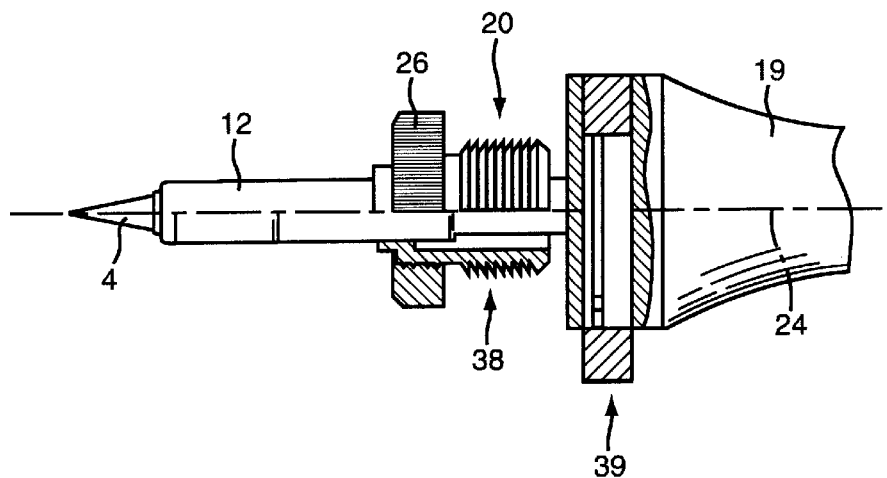
FIG. 11 shows, partly in section, a side view of a front end of a soldering iron with a third embodiment of a quick-change system.

In FIG. 11, the quick-change system 20 comprises a knurled nut 26 provided with a helical locking element 38 which is adapted to be brought into locking engagement with a complementary counterlocking element 39 provided in the handle section 19. The counterlocking element 39 is constructed as a locking slide member.

The knurled nut 26 provided with the thread 38 can, in turn, be supported rotatably on the bit holder 12 or it can be supported such that it is secured against rotation relative to said bit holder 12.

Figure 12:
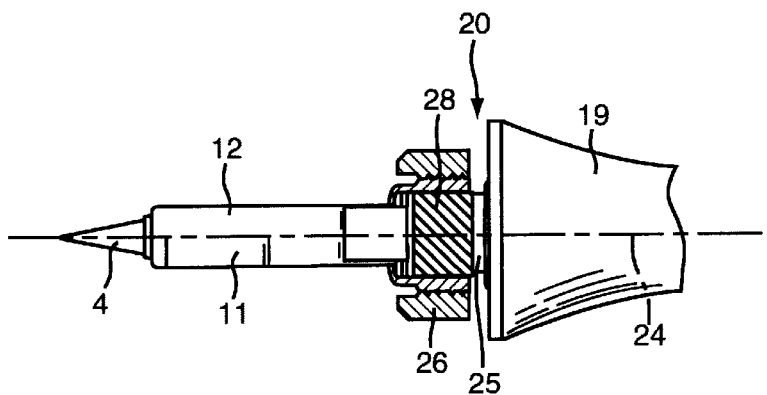
FIG. 12 shows, partly in section, a side view of a front end of a soldering iron with a fourth embodiment for a quick-change system.

In FIG. 12, the quick-change system 20 is defined by a knurled nut 26 which is adapted to be screwed onto a flange 25 provided on the handle section 19, said flange 25 having a coarse-pitch thread 28. The coarse-pitch thread can also be implemented as a self-locking multiple thread.

Figure 13:
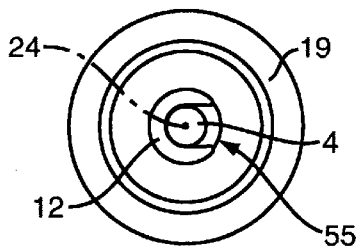
FIG. 13 shows a front view of a further embodiment for a bit holder.

FIG. 13 shows an embodiment of a bit holder 12 which has a lateral opening 55 on one side of the outer surface thereof, said lateral opening 55 being at least provided in the area of the soldering bit 4.

Figure 14:
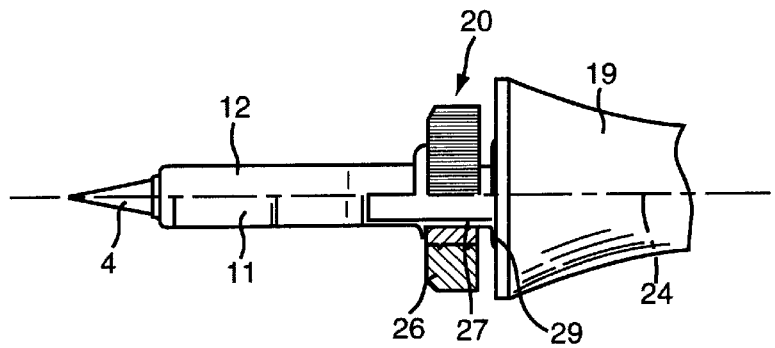
FIG. 14 shows, partly in section, a side view of a front end of a soldering iron with a bit holder according to FIG. 13.

According to FIG. 14, the quick-change system 20 is defined by a knurled nut 26, which is supported on the the bit holder 12, and by a flange 29 projecting beyond the handle section 19 and provided with a fine-pitch thread 27.

Figure 15:
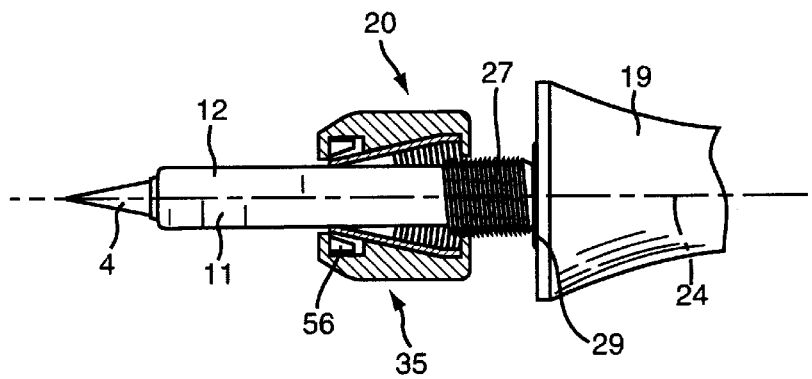
FIG. 15 shows, partly in section, a side view of a front end of a soldering iron with a fifth embodiment of a quick-change system.
Figure 16:
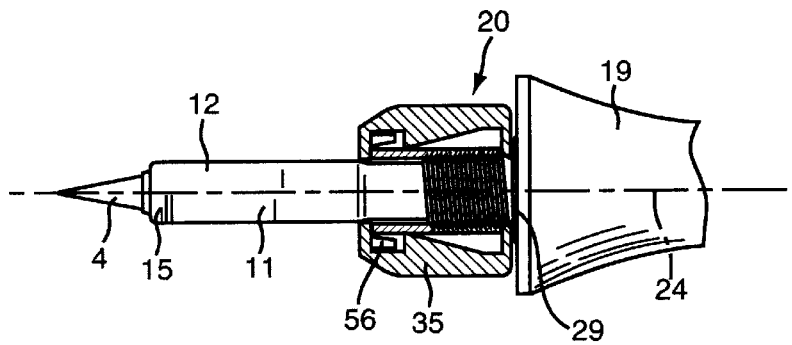
FIG. 16 shows a representation according to FIG. 15 where the quick-change system is at the fastening position.

In the embodiment according to FIGS. 15 and 16, the quick-change system 20 comprises a flange 29 arranged on the handle section 19 and provided with a fine-pitch thread 27, and a two-part snap-to thread 35 supported on the bit holder 12. In FIG. 15, the two parts of the snap-to thread are spread apart by a spring 56 so that the bit holder 12 can be pushed onto the flange 29.

In FIG. 16, the snap-to thread has been moved into contact with the fine-pitch thread 27 of the flange 29 and the bit holder 12 is secured to the handle section 19. The collar 15 and the heating element sleeve 11, or rather the relevant surfaces of these components, cf. the statements made hereinbefore, are in heat-conducting direct contact with one another.

Figure 17:
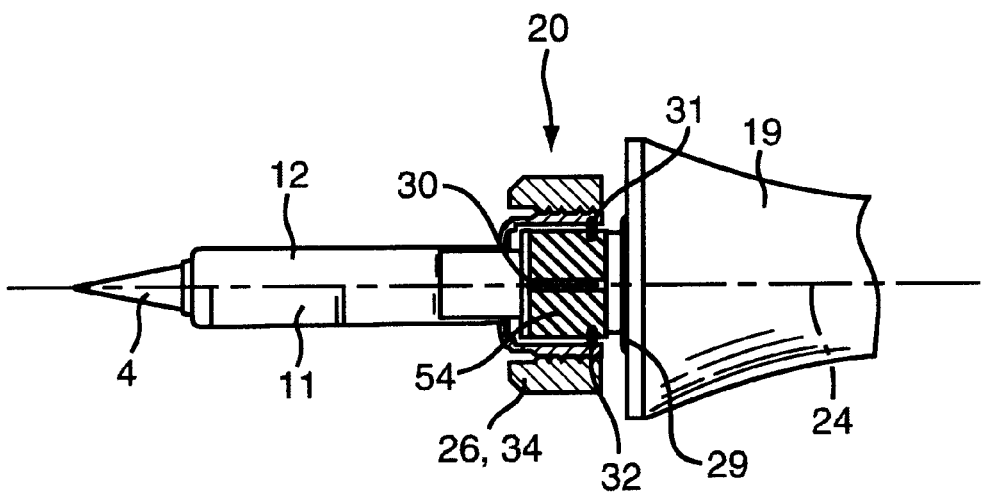
FIG. 17 shows, partly in section, a side view of a front end of a soldering iron with a sixth embodiment for a quick-change system.
Figure 18:
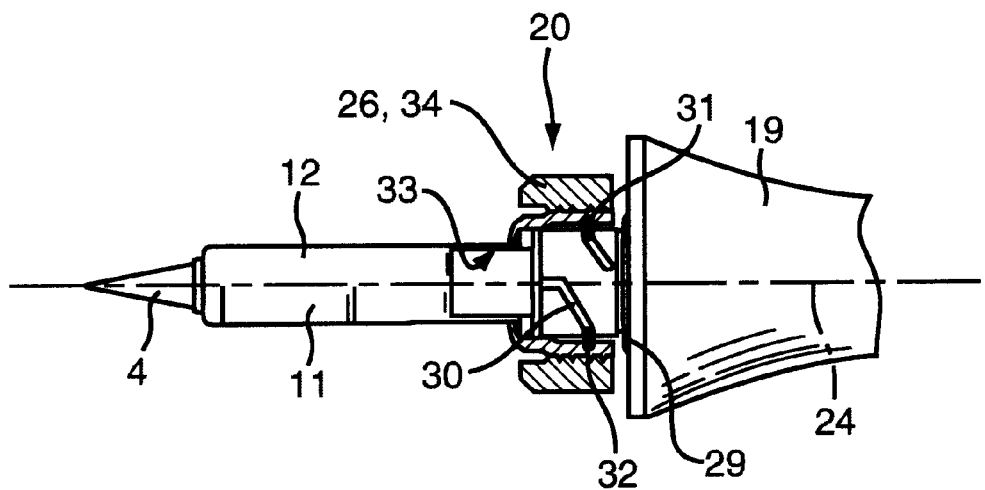
FIG. 18 shows, partly in section, a side view of a front end of a soldering iron with a seventh embodiment for a quick-change system.

In FIG. 17, the quick-change system 20 is defined by a knurled nut 26 or a ring 34 suppoted on the bit holder 12. Furthermore, the quick-change system 20 includes a flange 29 with a coarse-pitch thread and a groove 30, said groove 30 being adapted to have inserted therein two bolts 31, 32 on the inner side of the knurled nut 26 and of the ring 34, respectively.

In a last embodiment of the quick-change system 20, said quick-change system comprises a knurled nut 26 and a ring 34, which is supported on the bit holder 12, as well as a flange 29 attached to the handle section 19 and provided with obliquely extending grooves 30. In these grooves, bolts 31 and 32 are guided, said bolts projecting on the inner side 33 of the bit holder 12 and on the knurled nut 26 and the ring 34, respectively.

Figure 19:
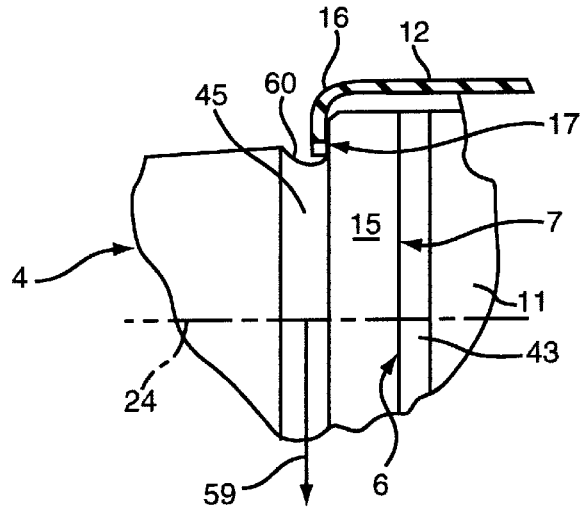
FIG. 19 shows an enlarged representation of a fifth embodiment used for fastening a soldering bit, similar to the embodiments shown in FIG. 7 to 9.

In a fifth embodiment used for fastening a soldering bit according to FIG. 19, a groove 45 surrounding the soldering bit 4 is arranged directly adjacent the collar 15. Said groove 45 is engaged by at least part of the opening edge 16 of the bit holder 12. Said opening edge 16 extends inwards in the radial direction 59, the contact bevel 17 of the collar 15 extending down to the base 60 of the groove 45. Said base 60 of the groove is in this connection asymmetrical with respect to the radial direction 59, i.e. said base of the groove merges e.g. on the side of the collar 15 with the contact bevel 17 extending at right angles to the longitudinal axis 24 in the case of the embodiment shown. On the opposite side of the groove 45, the base of the groove extends, in the plane of FIG. 19, at an oblique angle to the left up to the outer side of the soldering bit 4.

The groove 45 can also be arranged in spaced relationship with the collar 15 and, analogously to FIG. 19, said groove 45 can also be in engagement with at least part of an opening edge. In addition, said groove 45 can also be used without a collar 15 projecting outwards beyond the rest of the soldering bit 4 in the radial direction 59, said groove being then used for fastening, by means of the bit holder 12, the soldering bit directly to the heating element sleeve 11 or directly to the heating element. Furthermore, the opening edge 16 can also engage said groove 45 with a certain amount of play, the soldering bit being in this case secured in position by means of the bit holder 12 analogously to one of the preceding embodiments.

Figure 20:
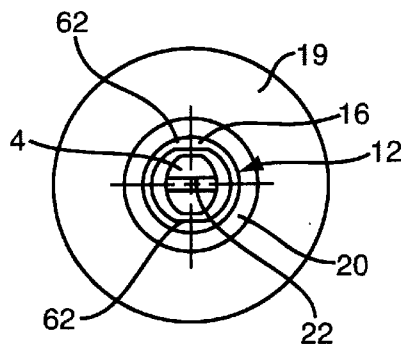
FIG. 20 shows a front view of a soldering iron according to embodiment shown in FIG. 19.

FIG. 20 shows a front view of a soldering bit 4 provided with a bit holder 12 in anlogy with the embodiment according to FIG. 19. It can especially be seen that the opening edge 16 of the bit holder 12 engages by means of diametrically opposed insertion-edge portions 61 complementary groove portions 62 of the groove 45 according to FIG. 19. The groove 45 may also be provided exclusively in these engagement areas of the insertion-edge portions 61, i.e. it may be limited to said groove portions 62.

The embodiment according to FIG. 20, additionally shows the feature that the soldering bit 4 and the bit holder 12 have an essentially oval or elliptical shape at least in the area of the groove 45 and of the opening edge 16, respectively. The soldering bit 4 and the bit holder 12 may also have an oval shape throughout their whole length. The dimensions of an e.g. elliptical soldering bit 4 and opening edge 16 are preferably such that a large semiaxis of the soldering bit 4 is larger than a small semiaxis of the opening edge 16 and smaller than a large semiaxis of the opening edge 16.

Figure 21:
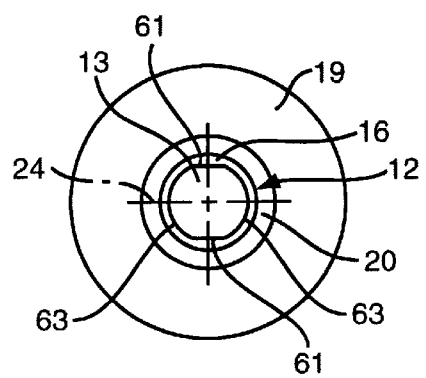
FIG. 21 shows a front view corresponding to FIG. 20, without any soldering bit.

In FIG. 21, the front view according to FIG. 20 is shown in a condition in which the soldering bit 4 is not inserted. It can especially be seen that the essentially oval cross-section of the opening 13 of the bit holder 12 is formed by two rounded end portions 63 which are interconnected by essentially straight insertion-edge portions 61 that extend parallel to one another. On the whole, the opening 13 has a cross-section which is point-symmetrical to the longitudinal axis 24.

With regard to the function of the soldering iron according to the present invention it is pointed out that an improved heat transfer takes place between the heating element and the soldering bit, since the contact surface and the heat reception surface are in direct, heat-transmitting contact with one another throughout their whole surfaces. Furthermore, the soldering bit is automatically centered relative to the heating element and the heating element sleeve, respectively, by the combined effect produced by the opening edge and the collar of the soldering bit. The intimate direct contact between the heat reception surface and the contact surface is improved still further by the fact that the friction between the opening edge and the collar is higher than that between the contact surface and the heat reception surface. This has the effect that, when the bit holder is attached to the handle section by means of the various quick-change systems, the bit holder will continue to entrain the soldering bit after the first contact between said soldering bit and the heating element sleeve, i.e. the soldering bit will be rotated relative to the heating element sleeve. In this way, an improved heat-transmitting contact will be established between the contact surface and the heat reception surface, since said surfaces will be smoothed and air cushions, which may for example exist between said surfaces, will be eliminated effectively.

What is claimed is:

1. A soldering iron comprising a housing for accommodating therein at least one heating means, and a soldering bit which is releasably secured to said housing, said heating means including a heat-transmitting contact surface provided on an end face thereof which faces the soldering bit, said heating means further including a heating element having a filament winding, and a heat reception surface of said soldering bit being located opposite said contact surface, the contact surface and the heat reception surface being plane-parallel throughout the whole area thereof and heat-conducting direct contact existing between said contact surface and said heat reception surface with no intermediate layer therebetween, characterized in that a temperature sensor is arranged adjacent said contact surface and between said contact surface and said filament winding of said heating element.

2. A soldering iron according to claim 1, characterized in that
the contact surface (6) and the heat reception surface (7) are axially symmetrical with respect to the longitudinal axis (24) of the soldering bit (4).

3. A soldering iron according to claim 1 characterized in that
the contact surface (6) and the heat reception surface (7) are adapted to be rotated relative to one another.

4. A soldering iron according to claim 1, characterized in that
the contact surface (6) and the heat reception surface (7) are circular.

5. The soldering iron of claim 4 wherein said contact surface and said reception surface have the same radius.

6. A soldering iron according to claim 1, characterized in that
the heat reception surface (7) has the same size as or a larger size than the contact surface (6).

7. A soldering iron according to claim 1, characterized in that
the heating means (3) is an electric heating element (8).

8. A soldering iron according to claim 1, characterized in that
at least the contact surface (6) consists of a material (9) for optimizing the transfer of heat.

9. A soldering iron according to claim 1, characterized in that
the heating means (3) comprises an electric heating element (8) whose end portion (10), which faces the soldering bit (4), is inserted in a heating element sleeve (11) consisting of a material (9), for optimizing the transfer of heat.

10. The soldering iron of claim 9 wherein said material of heating element sleeve is silver.

11. A soldering iron according to claim 1, characterized in that
the housing (2) comprises a bit holder (12) which is releasably secured to the rest of the housing and which has especially the shape of a sleeve, at least an end portion of the heating means (3) being arranged in said bit holder (12), the soldering bit (4) being releasably secured to the free end (14) of said bit holder (12).

12. A soldering iron according to claim 11, wherein said free end (14) of said bit holder (12) is provided with an opening (13) through which the soldering bit (4) projects, the end of the soldering bit (4) facing the heating means (3) being provided with an at least partially circumferentially extending collar (15) engaging behind an opening edge (16) of said opening (13).

13. A soldering iron according to claim 12, characterized in that
the opening edge (16) and the collar (15) are provided with contact bevels (17, 18) which face one another and which abut on one another so as to provide a backlash-free contact between said opening edge (16) and said collar (15).

14. A soldering iron according to claim 12, characterized in that
the opening edge (16) extends radially inwards in the direction of a longitudinal axis (24).

15. A soldering iron according to claim 12, characterized in that
the opening edge (16) and the contact bevel (17) of the collar (15) extend substantially at right angles to the longitudinal axis (24).

16. A soldering iron according to claim 12, characterized in that
a retaining projection (44) projects radially outwards beyond the soldering bit (4) and that said retaining projection (44) extends in spaced relationship with the collar (15).

17. The soldering iron according to claim 16, wherein said retaining projection comprises an annular bead extending around said soldering bit (4).

18. A soldering iron according to claim 16, characterized in that
a groove (45) is formed between said retaining projection (44) and said collar (15), said groove (45) being used for receiving therein at least part of the opening edge (16).

19. A soldering iron according to claim 12, characterized in that a groove (45) is formed in the soldering bit (4) in the direction of the front end (22) of said soldering bit in spaced relationship with the collar (15), the opening edge (16) of the bit holder (12) engaging said groove (45).

20. A soldering iron according to claim 19, characterized in that
the groove (45) is arranged at least on opposite sides of the soldering bit (4).

21. A soldering iron according to claim 19, wherein said soldering bit (4) has a non-circular cross-section at least in the area of said groove.

22. A soldering iron according to claim 17, characterized in that
the groove (45) has an asymmetrical cross-section with respect to the radial direction (59).

23. The soldering iron according to claim 19 wherein said bit holder (12) has a non-circular cross-section at least in the area of said opening edge.

24. A soldering iron according to claim 12 wherein a first friction between the opening edge and the collar is more than a second friction between the contact surface and the heat reception surface.

25. A soldering iron according to claim 9 wherein said bit holder (12) is open on one side thereof adjacent said free end.

26. A soldering iron according to claim 11 wherein said housing includes a first tulip-shaped handle portion that surrounds the bit holder at least partially, said first handle portion conically enlarging in the direction of the soldering bit.

27. A soldering iron according to claim 26 wherein said bit holder supports said first handle portion and further comprising a quick-change system disposed between said first handle portion and a second handle section.

28. A soldering iron according to claim 9 wherein a first line normal to said contact surface extends parallel to a longitudinal axis of said soldering bit and wherein a second line normal to said heat reception surface extends parallel to a longitudinal axis of said bit holder.

29. A soldering iron according to claim 1 further comprising a bit holder releasably securing said soldering bit to said housing and extending along a longitudinal axis, said bit holder having an opening on one end, said notch arranged in spaced relation to said opening and extending generally at right angles to said longitudinal axis.

30. A soldering iron according to claim 29 wherein said notch is implemented as a depressed notch which is displaced inwardly in the direction of the longitudinal axis.

31. A soldering iron according to claim 30 wherein said depressed notch is implemented as a circumferential notch extending around the bit holder.

32. A soldering iron according to claim 29 wherein a first distance between the notch and the opening is at least equal to a second distance between the contact surface and the opening.

33. A soldering iron according to claim 1, characterized in that said bit holder (12) releasably secures to a handle section (19) of said housing (2).

34. A soldering iron according to claim 33 wherein said bit holder (12) releasably secures to said handle section (19) of said handle section (19) via a threaded flange (25) attached to said handle section (19) and a knurled nut (26) rotatably supported on said bit holder (12).

35. A soldering iron according to claim 33 wherein said bit holder releasably secures to said handle section via a flange having an oblique groove therein and attached to said handle section and at least one bolt provided in the bit holder and adapted to be guided along said groove.

36. A soldering iron according to claim 35 wherein said at least one bolt projects from an inner side of a ring rotatably supported on one end of the bit holder.

37. A soldering iron according to claim 33 wherein said bit holder releasably secures to said handle section via a threaded flange attached to the handle section and a snap-to thread provided on the bit holder.

38. A soldering iron according to claim 37 wherein said snap-to thread comprises two parts spring biased to be open.

39. A soldering iron according to claim 33 wherein said bit holder releasably secures to said handle section via a hook nut on the bit holder and an obliquely extending clamping nut in the handle section.

40. A soldering iron according to claim 33 wherein said bit holder releasably secures to said handle section via a locking element on the bit holder and a counterlocking element on the handle section.

41. A soldering iron according to claim 40 wherein said locking element includes teeth and the counterlocking element comprises a locking slide member.

42. A soldering iron according to claim 33 wherein said bit holder releasably secures to said handle section of said handle section via a threaded flange having a coarse-pitch thread.

43. A soldering iron according to claim 33 wherein said bit holder releasably secures to said handle section of said handle section via a threaded flange having a multiple thread.

44. A soldering iron according to claim 1 wherein said heating element comprises a filament winding wound onto a winding carrier.

45. A soldering iron according to claim 1, characterized in that the heating element consists of ceramic and that a temperature sensor (42) is embedded in ceramic material in said heating element (8).

46. A soldering iron according to claim 1 wherein at least one of said heat reception surface and said contact surface are formed by a metallic material that includes chromium.

47. The soldering iron according to claim 1 wherein at least one of said heat reception surface and said contact surface are formed by a metallic material that includes nickel.

* * * * *